United States Patent
Beene

(12) United States Patent (10) Patent No.: US 7,429,866 B2
Beene (45) Date of Patent: Sep. 30, 2008

(54) SYSTEM AND METHOD FOR RESISTANCE MEASUREMENT

(75) Inventor: Gerald Wayne Beene, Southlake, TX (US)

(73) Assignee: Avo Multi-Amp Corporation, Dallas, TX (US)

( * ) Notice: Subject to any disclaimer, the term of this patent is extended or adjusted under 35 U.S.C. 154(b) by 248 days.

(21) Appl. No.: 11/465,984

(22) Filed: Aug. 21, 2006

(65) Prior Publication Data

US 2008/0042664 A1     Feb. 21, 2008

(51) Int. Cl.
   *G01R 27/08* (2006.01)
   *G01R 35/00* (2006.01)

(52) U.S. Cl. ............... 324/707; 324/601; 324/713; 324/720; 324/721

(58) Field of Classification Search ......... 324/601, 324/707, 713, 720, 721
   See application file for complete search history.

(56) References Cited

U.S. PATENT DOCUMENTS

| | | | |
|---|---|---|---|
| 5,467,021 A | 11/1995 | Adamian et al. | |
| 5,532,603 A | 7/1996 | Bottman | |
| 5,559,427 A | 9/1996 | Hinds et al. | |
| 5,629,628 A | 5/1997 | Hinds et al. | |
| 5,677,633 A | 10/1997 | Moser et al. | |
| 5,698,985 A | 12/1997 | Bottman | |
| 5,714,885 A | 2/1998 | Lulham | |
| 5,846,236 A | 12/1998 | Lindenmeier et al. | |
| 6,022,347 A | 2/2000 | Lindenmeier et al. | |
| 6,041,041 A | 3/2000 | Ramanathan et al. | |
| 6,388,437 B1 | 5/2002 | Wolski et al. | |
| 6,397,159 B1 | 5/2002 | Richardson | |
| 6,522,152 B1 | 2/2003 | Tonti et al. | |
| 6,573,733 B2 * | 6/2003 | Bohley | 324/519 |
| 6,611,147 B2 | 8/2003 | White et al. | |
| 6,823,283 B2 | 11/2004 | Steger et al. | |
| 6,847,213 B2 | 1/2005 | Renken et al. | |
| 6,894,504 B2 * | 5/2005 | Faulkner | 324/539 |
| 6,998,853 B2 * | 2/2006 | Renken | 324/539 |
| 7,034,546 B2 * | 4/2006 | Manani et al. | 324/539 |
| 7,035,959 B2 | 4/2006 | Umezu et al. | |
| 7,053,830 B2 | 5/2006 | Krumm et al. | |
| 7,165,005 B2 | 1/2007 | Steger et al. | |
| 7,178,561 B2 | 2/2007 | Memmott et al. | |
| 7,187,861 B2 | 3/2007 | Ruchet | |
| 2003/0074489 A1 | 4/2003 | Steger et al. | |
| 2004/0113604 A1 | 6/2004 | Renken et al. | |
| 2004/0263388 A1 | 12/2004 | Krumm et al. | |
| 2005/0044260 A1 | 2/2005 | Abramson et al. | |
| 2005/0270236 A1 | 12/2005 | Krumm et al. | |
| 2007/0154212 A1 | 7/2007 | Ruchet et al. | |

\* cited by examiner

*Primary Examiner*—Timothy J Dole
(74) *Attorney, Agent, or Firm*—Conley Rose, P.C.; J. Robert Brown, Jr.

(57) ABSTRACT

A method for improved cable resistance measuring is provided including coupling a measurement test device including a master unit and a remote unit, via at least one connector, to at least one network cable and determining a terminating impedance using field calibration. The method additionally including transmitting an AC signal across the network cable for determining a resistance of the network cable, and measuring a length of the network cable. The method still further including measuring a capacitance of the network cable, and measuring an impedance of the network cable terminated by the measurement test device. The method additionally including extracting the resistance of the network cable from the impedance measurement, and correcting for error in at least one of capacitance, termination resistance, and nominal cable effects for a corrected resistance value.

20 Claims, 3 Drawing Sheets

SYSTEM AND METHOD FOR RESISTANCE MEASUREMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable

FIELD OF THE INVENTION

This invention relates in general to the field of measurement devices for measuring local area network cabling and connectors and more specifically, but not by way of limitation, to an apparatus and method for resistance measurement.

BACKGROUND OF THE INVENTION

Information system networks include cabling, connectors, and adapters for communicating data signals. The cabling, connectors, and adapters installed in an office or other structure must meet certain standards to assure that the network is operable for the use of businesses in the structure. To certify network cabling, a measurement or test device may be connected at one point in the LAN of the structure and a second measurement device may be connected at another point in the LAN. The first measurement device, for example, generates a signal that is transmitted through the LAN cabling that is received by the second measurement device, which analyzes the signal to evaluate the integrity of the cabling. In some instances a first measurement device may both transmit the test signal through the LAN cabling and also receive the signal, as for example in time domain reflectometry analysis of LAN cabling. A pair of the cable might be used as a communication path to send data between a master and a remote LAN test unit.

Connecting devices to LANs is typically accomplished using a network adapter. The adapter may include a plug to connect into the wall jack or plate, which connects to cabling comprising the LAN. One example of a network topology is a four-channel copper wiring system where each channel includes a pair of shielded copper wires.

The LAN may include a number of channel adapters, or wall plates with a female receiving portion or jack, and link adapters, or male plugs presented from the LAN. The correct channel adapter or link adapter, depending upon the topology at a particular location in the LAN, is required to connect a particular device to the LAN.

When the LAN cabling does not meet certification standards, the contractor, such as a building construction company or LAN cable installer, may be responsible to repair or: replace the LAN cabling to bring the network up to standards for certification. It is useful if the contractor knows where the LAN installation is failing to meet the certification standards.

A number of different conditions may be the cause of cabling failing to pass the LAN certification tests. The cable may be kinked somewhere along the cabling run, altering its electrical characteristics in such a manner as to degrade its frequency response and make it a barrier to transmission of data. A connector jack may be poorly mated to the network cabling, altering its electrical characteristics in such a manner as to degrade its frequency response and make it a barrier to transmission of data.

SUMMARY OF THE INVENTION

The present embodiment provides a network analysis device for improved measurement of resistance comprising an AC component to transmit and measure a signal for determining a resistance of a cable. The network analysis device further comprises a master unit comprising a master source impedance of transmitter to a receiving device resulting in a first master impedance, a plurality of diodes and a plurality of output capacitors resulting in a second master impedance, and a plurality of "shunt" diodes resulting in a third master impedance; and at least one coupling connector for connecting the network analysis device at the master unit to the cable. The network analysis device further comprises a remote unit comprising a remote source impedance transmitter to a receiving device resulting in as first remote impedance, a plurality of diodes and a plurality of output capacitors resulting in a second remote impedance, and a plurality of "shunt" diodes resulting in a third remote impedance; and at least one coupling connector for connecting the network analysis device at the remote unit to the cable. Additionally the network analysis device further comprises a correction component for improving the accuracy of the resistance of the cable by correcting for error in at least one of cable capacitance deviation from nominal, cable termination deviation from nominal, and nominal cable effects. The diodes have a low impedance when biased on and a high impedance when biased off. Therefore the diodes act as switches.

In one embodiment a method for improved cable resistance measuring is provided comprising coupling a measurement test device comprising a master unit and a remote unit, via at least one connector, to at least one network cable and determining a terminating impedance using field calibration. The method additionally comprises transmitting an AC signal across the network cable for determining a resistance of the network cable, and measuring a length of the network cable. The method still further comprises measuring a capacitance of the network cable, and measuring an impedance of the network cable terminated by the measurement test device. The method additionally comprises extracting the resistance of the network cable from the impedance measurement, and correcting for error in at least one of capacitance, termination resistance, and nominal cable effects for a corrected resistance value.

These and other features and advantages will be more clearly understood from the following detailed description taken in conjunction with the accompanying drawings and claims.

Figure 1:
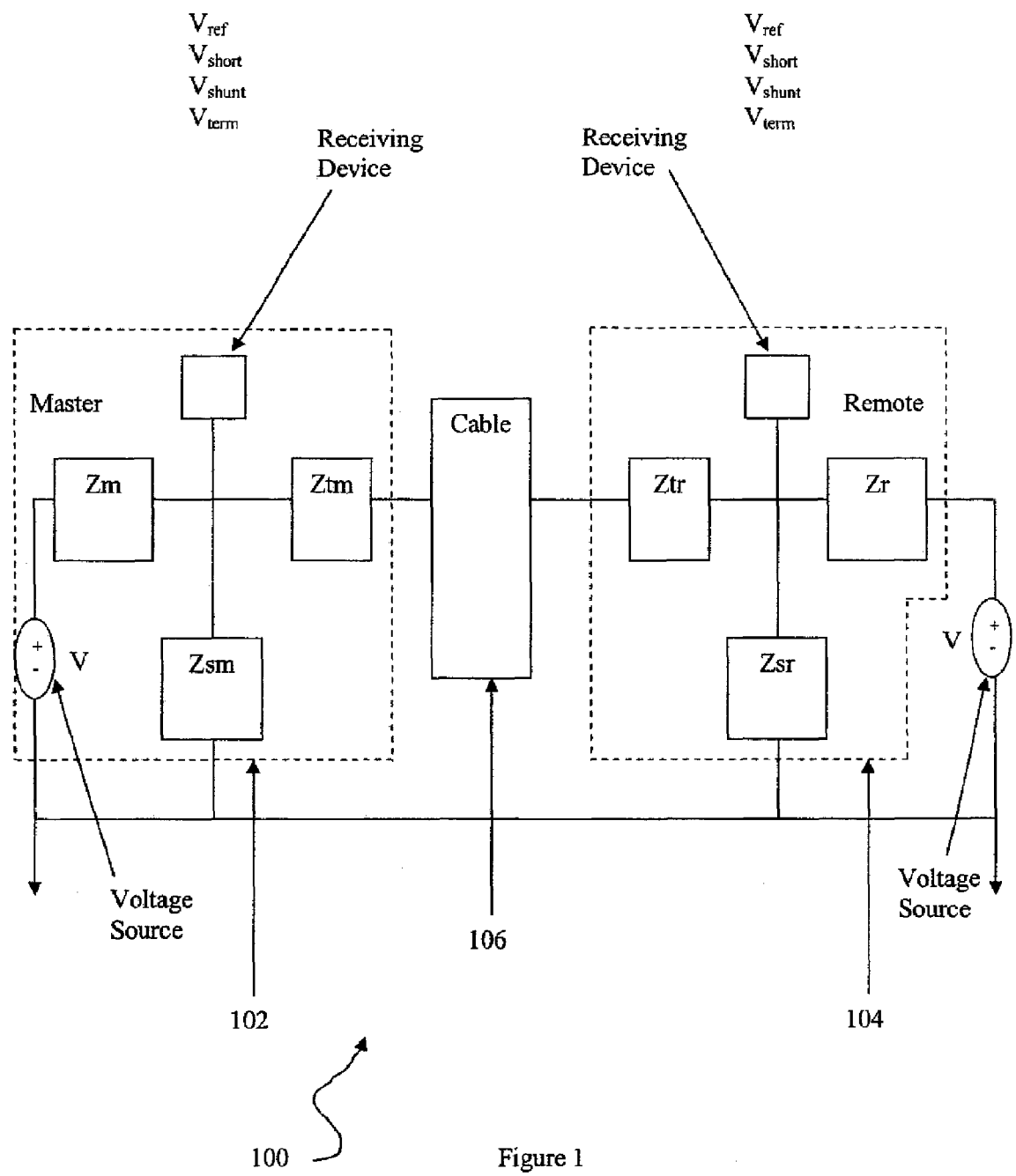
FIG. 1 illustrates a block diagram of a test device coupled for resistance measurements in a LAN according to one embodiment of the present disclosure.

For a more complete understanding of the presentation and the advantages thereof, reference is now made to the following brief description, taken in connection with the accompa-

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

One aspect of a LAN cable that may be measured and tested is the resistance. Most methods utilize a DC connection to measure the cable resistance, which can result in damaging DC currents being driven into the LAN test unit by power sources inadvertently applied to the cable. It is, therefore, desirable to measure cable resistance using a capacitive connection to the LAN test unit and utilizing AC frequencies. When measuring resistance using AC instead of DC, an accurate measure of impedance is attainable once the AC effects such as cable capacitance, inductance, and termination impedance are taken into account.

Using AC to measure cable resistance, however, induces some degree of inaccuracy that calls for correction in order to result in accurate resistance measurements. AC effects that result in necessary corrections include cable capacitance deviation from nominal, termination impedance deviation from nominal and nominal cable effects.

In the related art, LAN testers may measure the impedance of the terminated cable and subtract the impedance of the termination. Such a measurement results in a resistance reading that may be obtained from the real part of the resulting impedance. This method, however, has considerable error, particularly for longer lengths of cable.

An exemplary LAN cable to be measured is a 100 Ohm characteristic impedance AWG24 twisted pair cable. Such a cable may be mathematically modeled using rclg parameters (i.e. parameters per unit length) where:

| Value | Parameter |
|---|---|
| r | Resistance per unit length<br>For various gauges of 100 Ohm characteristic impedance cable, the main parameter change is resistance "r." |
| c | Capacitance per unit length |
| l | Inductance per unit length |
| g | Conductance per unit length<br>Conductance, g, may be neglected (set to zero) for cable at low frequencies such as 12.5 KHz. |

Using the cable model, if an actual cable matches the model, correction may be made for actual DC resistance vs. the measured resistance, based on nominal cable effects at the test frequency. The measured resistance may be defined as the total resistance of the terminated cable less the resistance of the termination.

If the actual cable does not match the model cable, corrections can be made based on measured parameters of the cable. Also, if the termination impedance has deviated from the nominal, corrections can be made.

Correction may be made if the cable characteristic capacitance is known. The total capacitance may be calculated by measuring. the open circuit (i.e., having no remote termination) impedance of the cable and using the equation $$C = \frac{1}{2\pi F |Xc|},$$

wherein (lower case "c"), capacitance per unit length, is calculated by dividing the total capacitance (upper case "C") by the length of the cable. The LAN tester of the present disclosure has the ability to measure the cable length based on delay and signal velocity through the cable. Additional corrections may be made if the terminating impedance of the cable is known.

Capacitance and termination corrections may be made by calculating the sensitivity of the resistance measurement to the cable capacitance and termination resistance. Sensitivity may be defined by the following derivative equation:

$$S = \frac{dz}{d\text{var}} \times \frac{\text{var}}{z}$$

where var is the variable, dvar is the incremental variable change, dz is the incremental impedance change, and z is the measured impedance of the terminated cable which is a function of the variable's length, the resistance per unit length "r," the capacitance per unit length "c," the inductance per unit length "l," the real termination nominal, and the imaginary termination nominal. Sensitivity is determined relative to length for both capacitance of the cable and termination resistance of the cable. For example, with S=0.5, a 1% change in the variable var will result in a 0.5% change in the sensitivity function.

Based upon an ideal cable with a nominal termination resistance, a polynomial function or other function of choice may be generated to calculate a corrected measured impedance as a function of deviation from the nominal termination impedance. Polynomial regression is used to generate approximate polynomial functions for each of the corrections. The polynomial functions simplify the calculation of the corrections for the parameters. The capacitance and termination corrected resistance may be used in the length polynomial to calculate the final corrected resistance.

In an embodiment where an actual resistance is measured instead of cable resistance, the correction of the present disclosure may be omitted. In one embodiment, no correction is necessary if the cable is less than 20 feet in length (or approximately 1 Ohm). Using such a limit, the unit measures resistance of a pure resistor substituted for a cable and adds no cable correction.

Referring to FIG. 1, a LAN tester 100 in accordance with embodiments of the present disclosure is shown. FIG. 1 shows an unbalanced model for simplicity whereas in actual practice, the circuit and cable would be balanced components. The LAN tester 100 comprises a master unit 102 and a remote unit 104 coupled by the subject cable 106 being tested by the LAN tester 100. The master unit 102 measures the impedance of the cable 106 terminated by the remote unit 104, and calculates the cable resistance. The measurements are based on AC impedance measurements taken at a frequency sufficiently low to minimize the effect of cable resonance, yet sufficiently high to pass current through coupling capacitors into the cable. In one embodiment, the frequency sufficiently low to minimize the effect of cable resonance, yet sufficiently high to pass current through coupling capacitors (at which AC impedance measurements are taken) is 12.5 KHz.

The remote unit 104 terminates the cable. When terminating the cable, the remote transmitter is off. In an embodiment, the remote unit 104 terminates the cable 106 in an open circuit. In an embodiment, the remote unit 104 terminates the cable 106 in a fixed termination comprising capacitor connected diodes. The remote transmit voltage is set to zero while the master unit is measuring impedance and is activated when the remote unit measures its impedance components.

In an embodiment, "through" and "shunt" diodes might be present to act as switches such that when the diodes are on, the switch is on and when the diodes are off, the switch is off.

The master unit 102 and the remote unit 104 each have various sources of internal impedance which are separately attributed to each respective unit in FIG. 1.

Z generally represents the impedance of the source impedance transmitter to a receiving device incorporated in each unit of the LAN tester 100. $Z_m$ is thus the impedance of the source impedance transmitter to the receiving device incorporated in the master unit 102, and $Z_r$ is the impedance of the source impedance transmitter to the receiving device incorporated in the remote unit 104.

Figure 2:
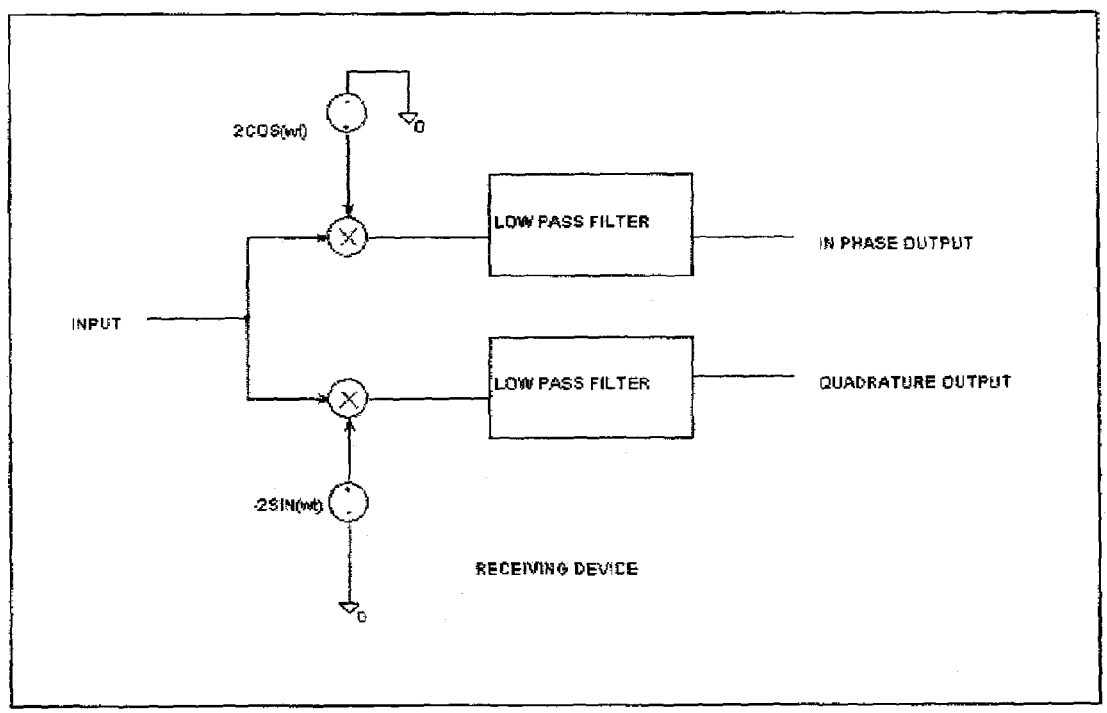
FIG. 2 depicts an exemplary receiving device according to one embodiment of the present disclosure.

FIG. 2 illustrates an exemplary receiving device that extracts the in-phase and quadrature component of an INPUT signal. The receiver may be implemented with analog circuits or in digital after conversion of the signal to digital form using an analog to digital converter. Other receiving devices may be used including Fourier transforms.

Consider the input signal to be equal to:

$$A \times \cos(w \times t + \theta)$$

where A is the signal amplitude and $\theta$ is the signal phase. w is the radian frequency of the signals.

$$w = 2 \times \pi \times \text{frequency}$$

Note that the frequency of the input signal is exactly the same as the receiver multiplication signals. The reason for this equality is that input signal and multiplier signals are derived from the same reference frequency.

The receiving device consists of two multiplications followed by low pass filters. The low pass filters remove the high frequency components generated by the multipliers.

The in-phase multiplication yields $$A \times \cos(w \times t + \theta) \times 2 \times \cos(w \times t)$$

This function expands to yield $$A \times \cos(\theta) + A \times \cos(2 \times w \times t + \theta)$$

The first term is the desired result (the in-phase component of the input signal) and the second term is a high frequency term which is filtered out by the LOW PASS FILTER. The in-phase output is a dc component $$A \times \cos(\theta)$$

The quadrature multiplication yields $$-A \times \cos(w \times t + \theta) \times 2 \times \sin(w \times t)$$

This function expands to yield $$A \times \sin(\theta) + A \times \sin(2 \times w \times t + \theta)$$

The first term is the desired result (the quadrature component of the input signal) and the second term is a high frequency term which is filtered out by the LOW PASS FILTER. The quadrature output is a dc component $$A \times \sin(\theta)$$

The signal may be represented as a complex number of the form $$A \times (\cos(\theta) + i \times \sin(\theta))$$

where i is the root of $-1$.

Returning to FIG. 1, $Z_t$ generally represents the impedance of a plurality of diodes and output capacitors incorporated in each unit of the LAN tester 100. $Z_{tm}$ is the $Z_t$ of the master unit 102 as measured initially, for example at the factory, and $Z_{tr}$ is the $Z_t$ of the remote unit 104 as measured initially.

$Z_s$ generally represents the impedance of "shunt" diodes incorporated in each unit of the LAN tester 100. $Z_{sm}$ is the impedance along the shunt path of the master unit 102 measured initially, and $Z_{sr}$ is the impedance along the shunt path of the remote unit 104 measured initially.

Figure 3:
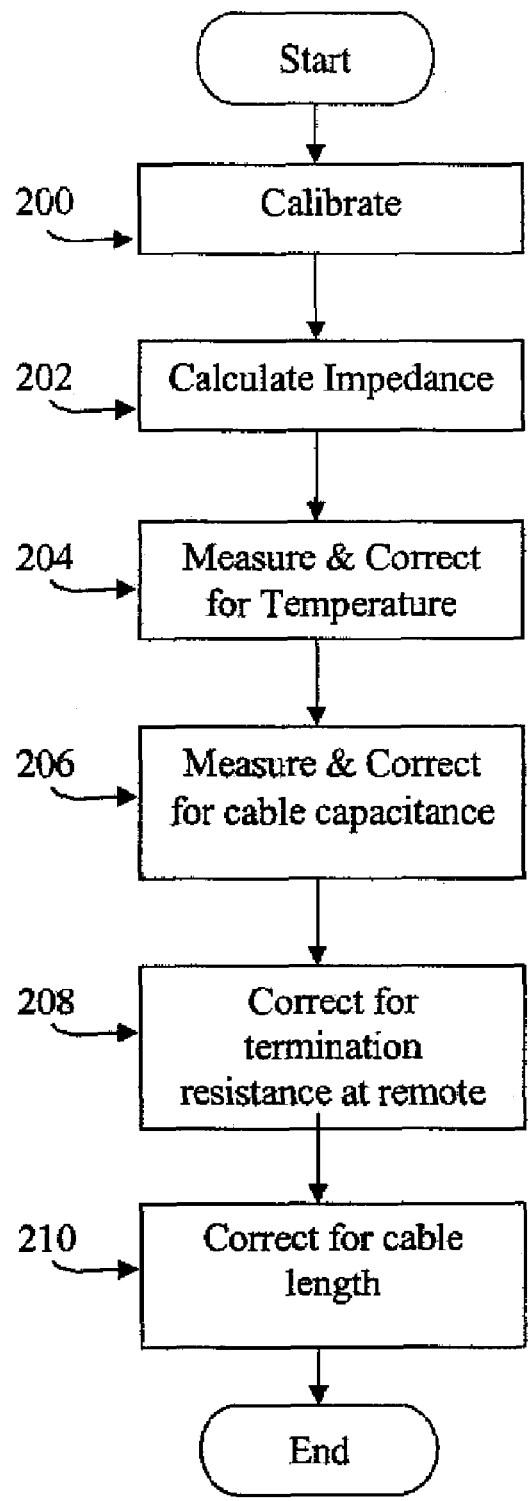
FIG. 3 depicts a flow-chart illustrating a method for measuring resistance in a cable.

Referring to FIG. 3, a flow chart for a method for improved cable resistance measurement and correction in accordance with an embodiment of the present disclosure is shown. The method includes, in block 200, factory calibration. For the master unit 102 and the remote unit 104, complex normalized voltages are recorded for calibration. For $V_{ref}$, the normalized voltage is measured and recorded with the "through" diodes turned off, the "shunt" diodes turned off, and the calibration load set for any amount. For $V_{short}$, the normalized voltage is measured and recorded with the "through" diodes turned on, the "shunt" diodes turned off, and the calibration load set for zero ohms. For $V_{shunt}$, the normalized voltage is measured and recorded with the "through" diodes turned off, the "shunt" diodes turned on, and the calibration load set for 100 ohms. For $V_{term}$, the normalized voltage is measured and recorded with the "through" diodes turned on, the "shunt" diodes turned off, and the calibrative load set for 100 ohms. Each of the voltages is normalized with respect to the reference voltage $V_{ref}$. The voltages measured must be complex in order to extract the complex impedances required for the measurement. Calibration further includes calculating the internal impedances on the front end (for both the master unit 102 and the remote unit 104) using the following equations:

$$\begin{pmatrix} Z \\ Z_s \\ Z_t \end{pmatrix} = \begin{bmatrix} -(V_{term} \cdot V_{short} - V_{term} - V_{short} + 1) \cdot \dfrac{Z_{term}}{-V_{term} + V_{short}} \\ \dfrac{Z}{\dfrac{1}{V_{shunt}} - 1} \\ \dfrac{Z}{\dfrac{1}{V_{short}} - 1} \end{bmatrix}$$

where $Z_t$ is the impedance of the "through" diodes when on, including output capacitors, Z is the impedance of the source impedance transmitter to the receiving device, $Z_s$ is the impedance of the "shunt" diodes when on, and $Z_{term}$ is a calibration standard, such as, for example, 100 Ohms with a 0.1% tolerance. $Z_{term}$ and $Z_{short}$ are calibration standards which are applied at the remote 104 and master 102 units in lieu of the cable for calibration purposes. $V_{short}$ is the voltage-measured at the receiving device with a short circuit, $Z_{short}$, applied at the output terminals.

At block 202, the method proceeds with calculating impedance. In an embodiment, impedance is calculated, as a function of measured voltage, according to the formula:

$$Z_{meas} = \frac{(Z_t + Z) \cdot V_{meas} - Z_t}{V_{meas} - 1}$$

where $V_{meas}$ is the voltage measured at the receiving device (where Z and $Z_t$ intersect in FIG. 1). In an embodiment, $V_{meas}$ is complex and is normalized to the reference voltage. The following defines the terms used for "shunt" and "through" diode impedance:

Zsm factory measured "shunt" path impedance at the master

Ztm factory measured "through" path impedance at the master

Zsr factory measured "shunt" path impedance at the remote

Ztr factory measured "through" path impedance at the remote

Zsm' temperature corrected "shunt" path impedance at the master

Ztm' temperature corrected "through" path impedance at the master

Zsr' temperature corrected "shunt" path impedance at the remote

Ztr' temperature corrected "through" path impedance at the remote

The temperature correction is based on measurements in the field.

The method proceeds with measuring and correcting for temperature at block 204. In an embodiment temperature in the field can affect the accuracy of the measured resistance. The following equations govern the correction for temperature in block 204:

$$Ztm'=Ztm-(Zsm-Zsm')+ESRm\_correction$$

corrected through the path impedance at the master unit 102. This correction is based upon a good match in the "through" and "shunt" diode characteristics and a known function of ESR (equivalent series resistance of capacitance) to temperature. In an embodiment, the $ESR_{m\_correction}$ term is optional, and if used, is calculated based on temperature characteristics of the ESR of the 0.47 µF coupling capacitors which couple the test frequency of 12500 Hz to the output terminals of the master unit.

$$Ztr'=Ztr-(Zsr-Zsr')+ESRr\_correction$$

corrected through the path impedance at the remote unit 104. This correction is based upon a good match in the "through" and "shunt" diode characteristics and a predictable ratio of ESR to temperature. In an embodiment, the $ESR_{r\_correction}$ term is optional, and if used, is calculated based on temperature characteristics of the equivalent series resistance of the 0.47 µF coupling capacitors which couple the test frequency of 12500 Hz to the output terminals of the remote unit.

In the temperature correction step, the remote termination impedance is represented by $$Zremote = Ztr' + \frac{(Zsr' \times Zr)}{(Zsr' + Zr)}$$

The first approximation of cable impedance is obtained by taking the resistive or real part of the equation which subtracts the termination impedance from the measured impedance of the terminated cable from the master unit.

$$Zcable=Zmeas\_term-Zremote$$

$$R1=Real\_part(Zcable)$$

The method proceeds with measuring and correcting for cable capacitance at block 206. Measuring and correcting for the cable capacitance, in an embodiment, comprises setting the remote unit 104 for the "through" diodes turned off and the "shunt" diodes turned off, resulting in an open circuit at the remote unit 104, while the cable capacitance is measured by the master unit 102. The resulting measured impedance is a series resistance with a series capacitive reactance, and an equivalent parallel capacitance may be subtracted from the measurement for use in the correction formula. The equivalent parallel cable capacitance from the series impedance may be calculated according to the formula:

$$Zmeas\_open=Rmeas+jXc$$

and the capacitance is calculated according to the formula:

$$C = \frac{1}{2 \times \pi \times F \times |Xc|}.$$

Further correction to the resistance measurement may be made if the cable characteristic capacitance is known. The capacitance per unit length may be calculated by dividing the total capacitance by the cable length. The LAN tester 100 described herein has the ability to measure length. Correction according to the cable characteristic capacitance is governed by the following equations:

$$g(length)=b0+b1 \times length+b2 \times length^2$$

wherein b0, b1, and b2 are polynomial coefficients derived for the correction function, and the resistance corrected for capacitance and length is:

$$R1a=R1-g(length) \times Dc$$

where $$Dc = \frac{c\_actual - c\_24}{c\_24}$$

The method proceeds with correcting for termination resistance at the remote unit 104 at block 208. Further correction to the resistance measurement may be made if the terminating impedance is known. The remote unit 104 terminates the cable being tested 106 and the termination resistance can affect the measured cable resistance. The remote unit 104 measures its own resistance and conveys the resistance of the remote unit 104 to the master unit 102. The deviation from the nominal resistance is used in a correction algorithm, as governed by the equation below:

$$h(length)=c0+c1 \times length+c2 \times length^2$$

wherein c0, c1, c2 are coefficients derived for the correction polynomial, and the fractional change in termination resistance from the nominal is represented by:

$$Dr = \frac{rez2 - rez2n}{rez2n}$$

and the resistance corrected for the termination resistance is represented by:

$$R1b = R1a - Dr \times h(\text{length}).$$

The method proceeds with correcting for the length of the cable at block 210 based on thus far corrected resistance data. The above corrections result in the resistance measurement based on an ideal cable. Further correction to the resistance measurement of an ideal cable may be made by applying the following equations:

$$f(R1b) = a0 + a1 \times R1b + a2 \times R1b^2$$

$$R1c = f(R1b)$$

where R1c is the measured resistance corrected for first capacitance deviation from nominal, second termination resistance deviation from nominal, and finally nominal cable effects. a0, a1 and a2 are coefficients derived for the correction polynomial based on cable characteristics.

Though the correction procedure for improved resistance measurement described above is described in a particular order, the corrections of the various steps may be performed in any order, with varying resulting accuracy. In a preferred embodiment, the corrective steps are performed in the following order: cable capacitance first, cable termination second, and nominal cable effects last.

The measurement and correction method of the present disclosure may be clarified by way of exemplary calculations, shown below. For an AWG 24 cable at 12500 Hz:

rez2 = the input real part of the cable termination impedance at remote rez = the resistance of the terminated cable length = length of the cable in feet xc = the capacitative reactance of the un-terminated cable.

The correction polynomials are defined as follows, based on length in miles (5280 feet):

| a0 | 0.567 | b0 | −.63    | c0 | 0.152   |
|----|-------|----|---------|----|---------|
| a1 | 1.07  | b1 | −19.45  | c1 | −63.629 |
| a2 | .002  | b2 | −78.295 | c2 | −41.615 |

The variables for each example are plugged into the calculations, as discussed above:

EXAMPLE 1

1000 Feet (0.1894 Mile) of Cat 3 Cable $$\begin{pmatrix} rez2 \\ rez \\ \text{length} \\ xc \end{pmatrix} = \begin{pmatrix} 38.24 \\ 83.1 \\ 0.1894 \\ 595.8 \end{pmatrix}$$

The uncorrected measurement is 44.86Ω (83.1−38.24), the actual resistance is 54.8Ω, and the corrected measurement is 55.1Ω.

EXAMPLE 2

1000 Feet of Cat 5e Cable $$\begin{pmatrix} rez2 \\ rez \\ \text{length} \\ xc \end{pmatrix} = \begin{pmatrix} 38.24 \\ 83.89 \\ 0.1894 \\ 857.7 \end{pmatrix}$$

The uncorrected measurement is 45.65Ω, the actual resistance is 52.1Ω, and the corrected measurement is 52.4Ω.

EXAMPLE 3

1000 Feet of Cat 5e Cable with 2.5Ω Added to the Termination $$\begin{pmatrix} rez2 \\ rez \\ \text{length} \\ xc \end{pmatrix} = \begin{pmatrix} rez2n + 2.5 \\ 86.6 \\ 0.1894 \\ 857.7 \end{pmatrix}$$

The uncorrected measurement is 44.2Ω, the actual resistance is 52.1Ω, and the corrected measurement is 52.3Ω.

EXAMPLE 4

328 Feet of Cat 3 Cable $$\begin{pmatrix} rez2 \\ rez \\ \text{length} \\ xc \end{pmatrix} = \begin{pmatrix} 39.61 \\ 54.73 \\ 0.0621 \\ 1919.5 \end{pmatrix}$$

The uncorrected measurement is 15.12Ω, the actual resistance is 17.8Ω, and the corrected measurement is 17.9Ω.

EXAMPLE 5

328 Feet of Cat 3 Cable $$\begin{pmatrix} rez2 \\ rez \\ \text{length} \\ xc \end{pmatrix} = \begin{pmatrix} 39.75 \\ 54.74 \\ 0.0621 \\ 1909.5 \end{pmatrix}$$

The uncorrected measurement is 14.99Ω, the actual resistance is 17.3Ω, and the corrected measurement is 17.75Ω.

EXAMPLE 6

328 Feet of Cat 5 Cable $$\begin{pmatrix} rez2 \\ rez \\ length \\ xc \end{pmatrix} = \begin{pmatrix} 39.9 \\ 51.546 \\ 0.0456 \\ 3362 \end{pmatrix}$$

The uncorrected measurement is 11.646Ω, the actual resistance is 13.4Ω, and the corrected measurement is 13.3Ω.

EXAMPLE 7

1000 Feet Each of Cat 3+Cat 5

$$\begin{pmatrix} rez2 \\ rez \\ length \\ xc \end{pmatrix} = \begin{pmatrix} 39.94 \\ 125.15 \\ 0.3788 \\ 346.85 \end{pmatrix}$$

The uncorrected measurement is 85.21Ω, the actual resistance is 106.9Ω, and the corrected measurement is 111Ω.

EXAMPLE 8

1000 Feet Each of Cat 3+Cat 5e $$\begin{pmatrix} rez2 \\ rez \\ length \\ xc \end{pmatrix} = \begin{pmatrix} 39.88 \\ 122.4 \\ 0.3788 \\ 349 \end{pmatrix}$$

The uncorrected measurement is 82.52Ω, the actual resistance is 106.9Ω, and the corrected measurement is 106.8Ω.

EXAMPLE 9

2000 Feet Cat 5e $$\begin{pmatrix} rez2 \\ rez \\ length \\ xc \end{pmatrix} = \begin{pmatrix} 39.8 \\ 126.47 \\ 0.3788 \\ 421.2 \end{pmatrix}$$

The uncorrected measurement is 86.67Ω, the actual resistance is 105.3Ω, and the corrected measurement is 107.1Ω.

EXAMPLE 10

Pair of 24.9Ω Resistors $$\begin{pmatrix} rez2 \\ rez \\ length \\ xc \end{pmatrix} = \begin{pmatrix} 39.87 \\ 89.47 \\ .00 \\ 1.27 \times 10^6 \end{pmatrix}$$

The uncorrected measurement is 49.6Ω, the actual resistance is 49.9Ω, and no correction is applied because there is no cable involved.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A network analysis device for improved measurement of resistance, comprising:
   an AC component to transmit and measure a signal for determining a resistance of a cable;
   a master unit comprising a master source impedance transmitter to a receiving device resulting in a first master impedance, a plurality of diodes and a plurality of output capacitors resulting in a second master impedance, and a plurality of shunt diodes resulting in a third master impedance, and at least one coupling connector for connecting the network analysis device at the master unit to the cable;
   a remote unit comprising a remote source impedance transmitter to a receiving device resulting in a first remote impedance, a plurality of diodes and a plurality of output capacitors resulting in a second remote impedance, and a plurality of shunt diodes resulting in a third remote impedance, and at least one coupling connector for connecting the network analysis device at the remote unit to the cable; and
   a correction component for improving the accuracy of the resistance of the cable by correcting for error in at least one of cable capacitance deviation from nominal, cable termination deviation from nominal, and nominal cable effects.

2. The network analysis device for improved measurement of resistance of claim 1, further comprising a display component for displaying the resistance of the cable as corrected by the correction component.

3. The network analysis device for improved measurement of resistance of claim 1, wherein the correction component applies a polynomial function of the form $y=A+Bx+Cx^2$ to calculate a measured impedance as a function of a normal termination impedance.

4. The network analysis device for improved measurement of resistance of claim 1, further comprising a capacitance measurement component for measuring the cable capacitance.

5. The network analysis device for improved measurement of resistance of claim 4, wherein the capacitance measurement component shuts off one or more diodes at the remote unit for an open circuit at the remote unit, the master unit measures the cable impedance, and the capacitance measurement component calculates the cable capacitance by a formula of the form $$C = \frac{1}{2\pi \times \text{Frequency} \times |Xc|}.$$

6. The network analysis device for improved measurement of resistance of claim 1, wherein the correction component corrects for deviation from the nominal in cable capacitance per unit length by applying a polynomial function of the form: $g(\text{length})=b0+b1\times\text{length}+b2\times\text{length}^2$; calculating the error by equation of the form:

$$Dc = \frac{c_{actual} - c_{24}}{c_{24}} \text{ where } c_{actual} = \frac{cableC}{\text{length}};$$

and calculating the resistance corrected for capacitance and length by a formula of the form: $\text{Res}=\text{Rel}-Dc\times g(\text{length})$, where Rel is the measured resistance.

7. The network analysis device for improved measurement of resistance of claim 6, wherein the correction component corrects nominal cable characteristics by applying a polynomial function of the form: $f(R)=a0+a1\times R+a2\times R^2$ to correct for nominal cable characteristics, where R is the measured resistance corrected for capacitance.

8. The network analysis device for improved measurement of resistance of claim 1, wherein the correction component corrects for fractional changes in the termination resistance from the nominal by applying a polynomial function of the form: $h(\text{length})=d0+d1\times\text{length}+d2\times\text{length}^2$; calculating the fractional change in termination resistance by an equation of the form:

$$Dr = \frac{rez2 - rez2n}{rez2n};$$

and calculating the resistance corrected for termination resistance of the cable by a formula of the form:

Res2=Res−$Dr\times h$(length).

9. The network analysis device for improved measurement of resistance of claim 8, wherein the correction component corrects for error in nominal cable characteristics by applying a polynomial function of the form: $f(R)=a0+a1\times R+a2\times R^2$ to correct for nominal cable characteristics, where R is the measured resistance corrected for termination and capacitance.

10. The network analysis device for improved measurement of resistance of claim 1, wherein the correction component improves the accuracy of the resistance of the cable by correcting for error in the following order: first, cable capacitance deviation from nominal; second, cable termination deviation from nominal; and third, nominal cable effects.

11. A method for improved cable resistance measuring, comprising:
coupling a measurement test device comprising a master unit and a remote unit, via at least one connector, to at least one network cable;
determining a terminating impedance using field calibration;
transmitting an AC signal across the network cable for determining a resistance of the network cable;
measuring agent of the network cable;
measuring a capacitance of the network cable;
measuring an impedance of the network cable terminated by the measurement test device;
extracting the resistance of the network cable from the impedance measurement; and
correcting for error in at least one of capacitance, termination resistance, and nominal cable characteristics for a corrected resistance value.

12. The method for improved cable resistance measuring of claim 11, further comprising displaying the corrected resistance value.

13. The method for improved cable resistance measuring of claim 11, wherein coupling a measurement test device, via at least one connector, to at least one network cable comprises coupling the master unit in a first position on the network cable and coupling the remote unit in a second position on the network cable, the first position and the second position being physically remote from one another.

14. The method for improved cable resistance measuring of claim 11, further comprising measuring temperature and correcting the resistance value for temperature.

15. The method for improved cable resistance measuring of claim 11, wherein measuring the capacitance of the network cable comprises: setting up an open circuit at the remote unit; measuring, by the master unit, an impedance of the cable; and based on the impedance, calculating the capacitance according to an equation of the form:

$$C = \frac{1}{2\times\pi\times F\times|Xc|}.$$

16. The method for improved cable resistance measuring of claim 11, wherein correcting for error in capacitance for a corrected resistance value comprises:
applying a polynomial function of the form:

$g(\text{length}):=b0+b1\cdot\text{length}+b2\cdot\text{length}^2$ calculating the fractional change in capacitance by equation of the form:

$$Dc = \frac{c_{actual} - c_{24}}{c_{24}} \text{ where } c_{actual} = \frac{cableC}{\text{length}};$$

and calculating the corrected resistance value corrected for capacitance and length by a formula of the form: Res=Rel−Dc×g(length), where Rel is the measured resistance.

17. The method for improved cable resistance measuring of claim 16, wherein correcting for cable characteristics for a corrected resistance value comprises applying a polynomial function of the form:

$f(R)=a0+a1{\times}R+a2{\times}R^2$ to correct for nominal cable effects, where R is the measured resistance corrected for capacitance.

18. The method for improved cable resistance measuring of claim 11, wherein correcting for error in termination resistance for a corrected resistance value comprises:

applying a polynomial function of the form:

$h(length):=d0+d1 \cdot length+d2 \cdot length^2$ calculating the fractional change in termination resistance by an equation of the form:

$$Dr = \frac{rez2 - rez2n}{rez2n};$$

and calculating the resistance corrected for termination resistance of the cable by a formula of the form:

Res2=Res−Dr×h(length).

19. The method for improved cable resistance measuring of claim 18, wherein correcting for nominal cable effects for a corrected resistance value comprises applying a polynomial function of the form:

$f(R)=a0+a1R+a2{\times}R^2$ to correct for nominal cable effects, where R is the measured resistance corrected for termination.

20. The method for improved cable resistance measuring of claim 11, wherein correcting for error occurs in the following order: first, cable capacitance deviation from nominal; second, cable termination deviation from nominal; and third, nominal cable effects.

* * * * *

UNITED STATES PATENT AND TRADEMARK OFFICE
CERTIFICATE OF CORRECTION

PATENT NO. : 7,429,866 B2  Page 1 of 1
APPLICATION NO. : 11/465984
DATED : September 30, 2008
INVENTOR(S) : Gerald Wayne Beene It is certified that error appears in the above-identified patent and that said Letters Patent is hereby corrected as shown below:

Col. 16, line 15, replace "$f(R)=a()+a1R+a2xR^2$" with --$f(R)=a()+a1xR+a2xR^2$--

Signed and Sealed this

Thirtieth Day of December, 2008

JON W. DUDAS
*Director of the United States Patent and Trademark Office*